Patented Jan. 16, 1934

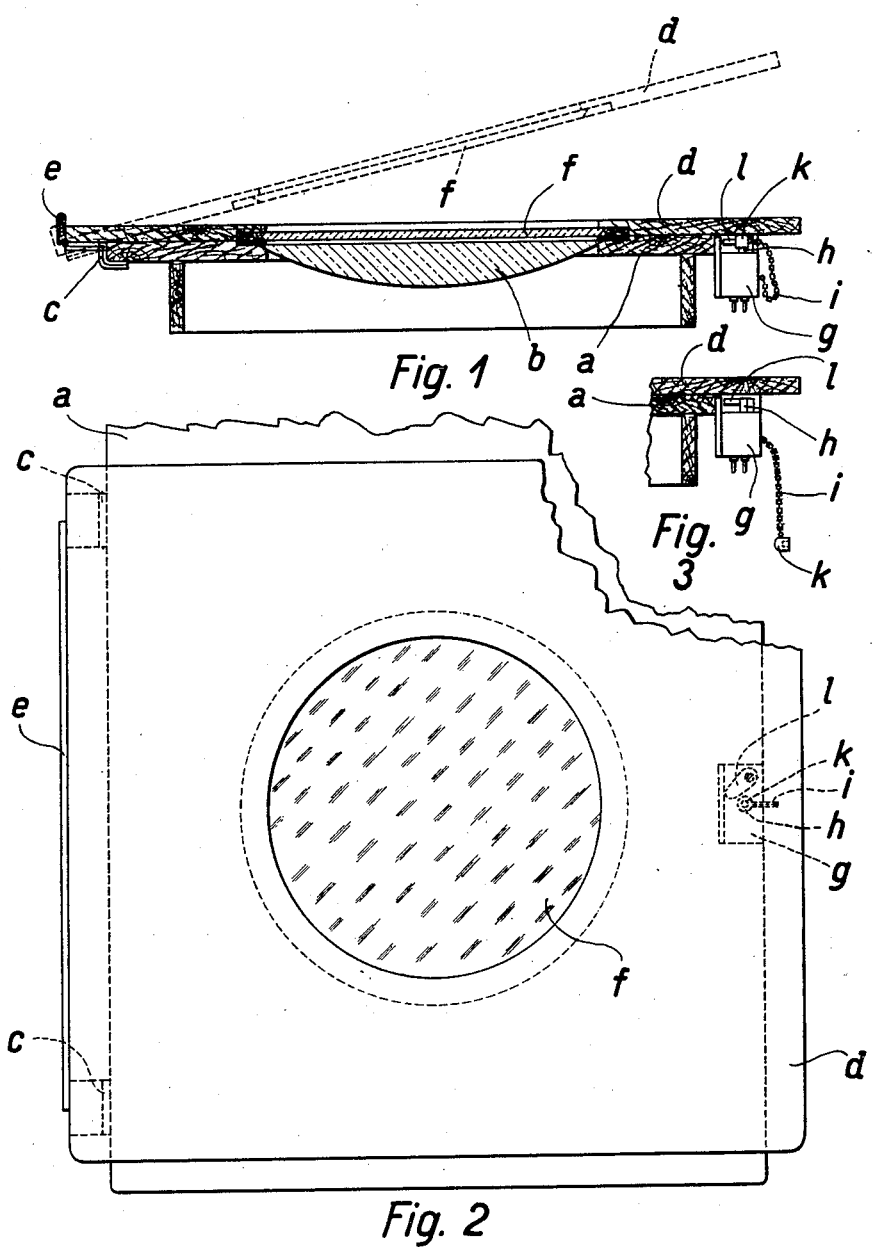

1,943,533

UNITED STATES PATENT OFFICE 1,943,533

OBJECT STAGE FOR PROJECTION APPARATUS

Max Hübschmann, Jena, Germany, assignor to firm Carl Zeiss, Jena, Germany

Application January 6, 1933, Serial No. 650,464, and in Germany January 14, 1932

1 Claim. (Cl. 88—26)

I have filed an application in Germany, January 14, 1932.

The invention relates to a novel object stage for apparatus projecting in transmitted light objects of great dimensions, this object stage being used for instance in the projection of the usual Röntgenograms. Object stages of this kind may be applied in projection apparatus in which an optical member of the condenser system, having conveniently a plane light exit surface, is so disposed in a corresponding aperture in the object stage that the plane light exit surface is approximately flush with the surface of this stage and provides a support for the object. The invention consists in this that the object stage is covered by a folding plate adapted to support a diaphragm restricting the image field, and of which at least the part corresponding to the said light exit surface is transparent. When the plate is turned open, the object to be projected, which is placed on the light exit surface of the optical member in the stage, may be easily changed for another, and the diaphragm restricting the image field may remain on the opened plate. When the plate is turned down, the part lying against the object, as a rule a plano-parallel glass plate, provides that this object, for instance a film, remains plane during the projection process. The diaphragm may be displaced on the plate, and this without any injury to the object, thus enabling any part of this object to properly lie in the image field.

When effecting in the projection process a change of objects, not all the projection light is to strike the screen, and this in order not to offend the observers' eyes, which, accustomed as they are to darkness, would require being suddenly adapted to increased intensity and, especially when objects of little transparency are projected, perceive the images only with difficulty. It is therefore advisable to place on the object stage a switch for the projection circuit and to provide that the circuit is closed by this switch when the folding plate is turned down. Raising the plate disconnects the light source and thus prevents any dazzling of the observers' eyes, which are accustomed to darkness, a further advantage being economy of current. In case no auxiliary source of light is available, provision may be made in the well-known manner that a weaker current feeds the light source during the interruption of the projection light current, so that this light source provides no more light than is necessary for the projecting person to safely operate the apparatus. Also it is advisable to provide the said switch with a push button the height of which may be increased by means of a detachable cap in such a manner that the switch is operated by the lifting and lowering of the plate only when it bears the said cap, this construction enabling the projecting person to make the illumination depend upon the movements of the plate or not.

The accompanying drawing represents by way of example a constructional form of the novel object stage according to the invention. Figure 1 shows the stage in central-sectional elevation, Figure 2 is a top view, and Figure 3 illustrates part of the device in elevational section.

The constructional example has an object stage $a$ in which a plano-convex lens $b$ pertaining to the condenser system is so disposed that its plane surface, which is to support the object, lies approximately in the surface of the stage. By means of two hinges $c$ a plate $d$ is so attached to the stage $a$ that it may be raised and lowered. This plate $d$, the hinged end of which has a ledge $e$, is made to contain a plano-parallel glass plate $f$ corresponding in size to the lens $b$. In a recess in the stage $a$ is disposed a push-button switch $g$, which is assumed to control the projection light circuit. The switch $g$ has a push button $h$ extending upwardly as well as a lever $l$, and to a chain $i$ is connected a cap $k$ that may be placed on the said button $h$.

When using the apparatus, and after having raised the plate $d$ into the position indicated in the drawing by dash lines, the object is placed on the lens $b$, and the plate $d$ is lowered so as to lie with its glass plate $f$ against the object and make it remain plane. In case the cap $k$ is placed on the push button $h$, the push-button height is increased according to Figure 1 of the drawing to such an extent that the plate $d$ presses the button $h$ into the switch $g$, which closes the projection light circuit. The plate $d$ holds a light-field diaphragm which may be displaced at will. When this plate $d$ is raised, the diaphragm is held in position by the ledge $e$, and, a change of objects having meanwhile been effected, it will properly lie over the new object. Raising the plate $d$ releases the push button $h$ and, consequently, interrupts the projection light circuit. When the cap is removed from the push button $h$ (Figure 3), the plate $d$ will not influence this button, and the projection light circuit remains interrupted. If it is desired to have this circuit closed continuously, the lever $l$, subsequently to pressing the button $h$, is to be turned in such a way that it retains the button $h$ in a corresponding position.

I claim:

An object stage for apparatus projecting in transmitted light objects of great dimensions, the object stage having a plane upper surface, a plano-convex lens disposed in the object stage, this lens having its plane surface lying approximately in the plane surface of the stage, a folding plate pivotally attached to the stage, at least that part of this plate which corresponds to the said lens being of a transparent material and having substantial contact with the plane surface of the lens, a push-button switch being disposed in the object stage, and a cap adapted to be placed on the push-button of the switch, the switch being adapted to be operated by the folding plate when the said cap rests on its push-button.

MAX HÜBSCHMANN.